(12) United States Patent
Chang et al.

(10) Patent No.: US 7,758,386 B2
(45) Date of Patent: Jul. 20, 2010

(54) SIM CARD CONNECTOR WITH ESD PROTECTION ATTACHED THEREON BY SOLDER BALL

(75) Inventors: Jen-Jou Chang, Tu-Cheng (TW); Yao-Pang Lu, Tu-Cheng (TW); Hsin-Hsien Yu, Tu-Cheng (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 12/420,774

(22) Filed: Apr. 8, 2009

(65) Prior Publication Data

US 2009/0253301 A1 Oct. 8, 2009

(30) Foreign Application Priority Data

Apr. 8, 2008 (CN) .................. 2008 2 0035033

(51) Int. Cl.
*H01R 24/00* (2006.01)

(52) U.S. Cl. ..................................... 439/630

(58) Field of Classification Search ............ 439/181, 439/620.16, 620.08, 620.02, 620.15, 630; 361/736–737, 716, 818, 111
See application file for complete search history.

(56) References Cited

U.S. PATENT DOCUMENTS

| | | | |
|---|---|---|---|
| 5,246,388 A * | 9/1993 | Collins et al. | 439/620.08 |
| 6,935,879 B2 * | 8/2005 | Whitney et al. | 439/181 |
| 7,442,087 B2 | 10/2008 | Long et al. | |
| 2001/0006855 A1* | 7/2001 | Koitsalu | 439/188 |
| 2008/0176450 A1 | 7/2008 | Long et al. | |
| 2008/0227330 A1 | 9/2008 | Zijlsira | |
| 2009/0251841 A1* | 10/2009 | Whalin et al. | 361/126 |

* cited by examiner

*Primary Examiner*—Phuong K Dinh
(74) *Attorney, Agent, or Firm*—Ming Chieh Chang; Wei Te Chung; Andrew C. Cheng

(57) ABSTRACT

A SIM Card connector with an ESD protection in accordance with a preferred embodiment of the present invention is provided. The SIM Card connector comprises a connector housing (1) with a plurality of contact passageways (101) in which a plurality of contact terminals (2) are received. Said SIM Card connector further includes an IC member (4) attached onto a bottom surface of the housing and a plurality of solder balls (3) sandwiched between the IC member and the contacts and contacted with the contact terminals.

10 Claims, 5 Drawing Sheets

SIM CARD CONNECTOR WITH ESD PROTECTION ATTACHED THEREON BY SOLDER BALL

BACKGROUND OF THE INVENTION

1. Field of the Invention

The present invention relates to a SIM Card connector, and more particularly to a SIM Card connector incorporated with an electrostatic discharge (ESD) protection. The SIM Card connector features that the ESD protection is attached onto the connector by solder ball thereby protecting a printed circuit board on which the connector is mounted.

2. Description of the Related Art

Traditional SIM Card connector at least includes an insulating housing with a plurality of passageways in which a plurality of contact terminals are received. Each terminal comprises a base portion retained into the insulating housing, a contact engaging portion adapted for contacting with electrical pads formed on a SIM Card, and a tail portion adapted for mounting onto a printed circuit board, thereby the SIM Card is electrically connected to the printed circuit board by the connector, particular by the contact terminals.

With the development of society and improvement demands of consumer, the function of mobile phone becomes more and more strongly, and electrostatic discharge is often happened in the mobile phone. Therefore, the printed circuit board further defines an electrostatic discharge protection circuit in order to protect the printed circuit board and components mounted thereon. When above SIM Card connector is mounted onto the printed circuit board, the tail portion of the terminal is connected with the electrostatic discharge protection circuit thereby protecting the printed circuit board.

BRIEF SUMMARY OF THE INVENTION

It is an object of the present invention to provide a SIM Card connector with ESD protection attached thereon by solder ball adapted for protecting a printed circuit board on which the connector is mounted been damaged from ESD.

In order to achieve the objective above, a SIM Card connector in accordance with a preferred embodiment of the present invention is provided. The SIM Card connector comprises a connector housing with a plurality of contact passageways in which a plurality of contacts are retained. Moreover, said connector further includes an IC member with ESD protection, which is attached on the housing by a solder ball.

In order to achieve the objective above, another SIM Card connector in accordance with a preferred embodiment of the present invention is provided. The SIM Card connector comprises an insulating housing, a plurality of contacts seated into the insulating housing, an IC member with ESD protection attached to the insulating housing, and a plurality solder balls sandwiched between the IC member and the contacts. The insulating housing defines a mating face and a mounting face opposite to the mating face. Each contact includes a retaining portion fixed into the housing, a spring portion with a contact engaging portion projected the mating face of the housing, and a tail portion.

Other objects, advantages and novel features of the invention will become more apparent from the following detailed description of the present embodiment when taken in conjunction with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like members in the figures and in which:

DESCRIPTION OF PREFERRED EMBODIMENT OF THE INVENTION

Figure 1:
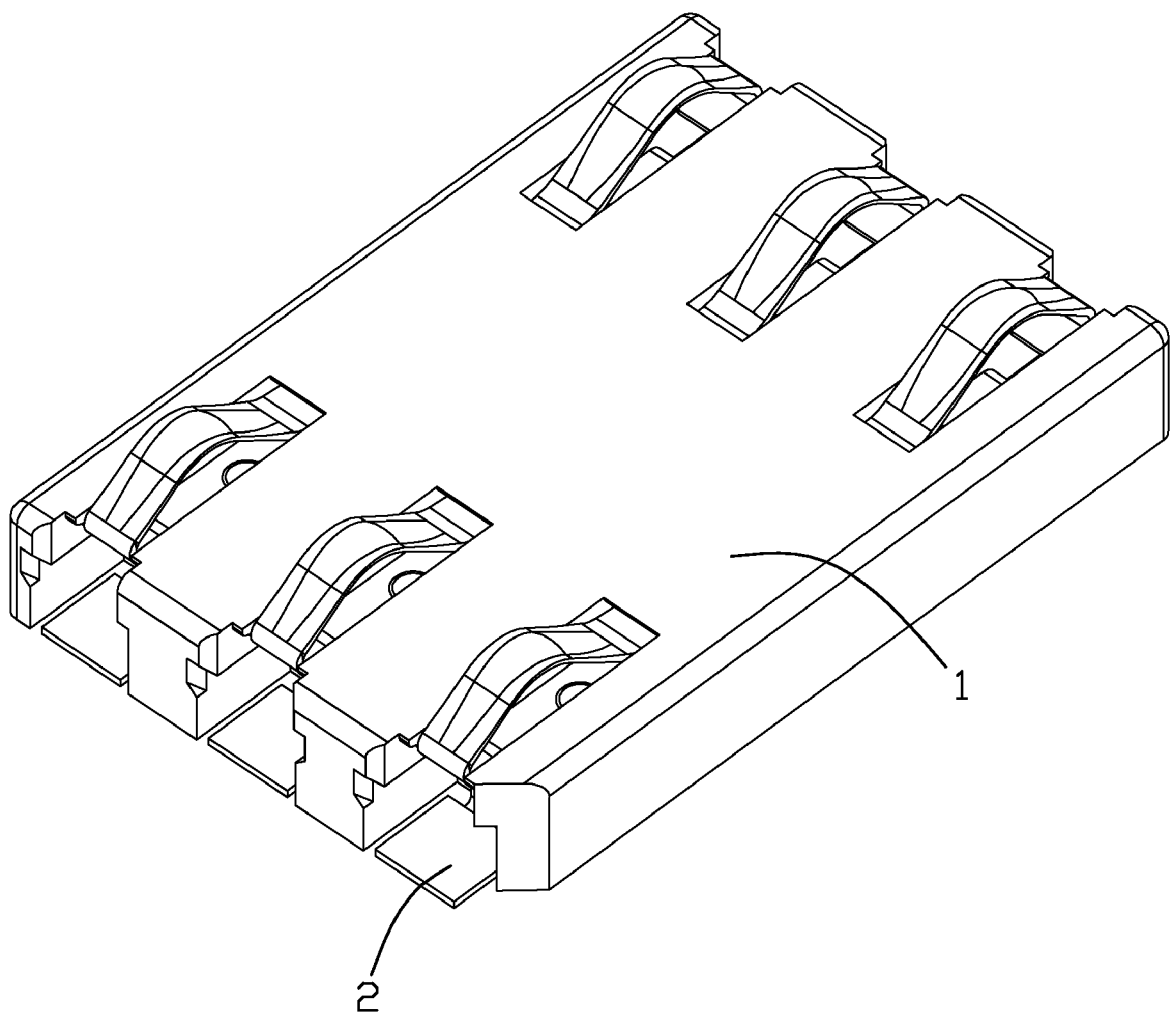
FIG. 1 is a perspective view of a SIM Card connector according to the embodiment of the present invention.
Figure 2:
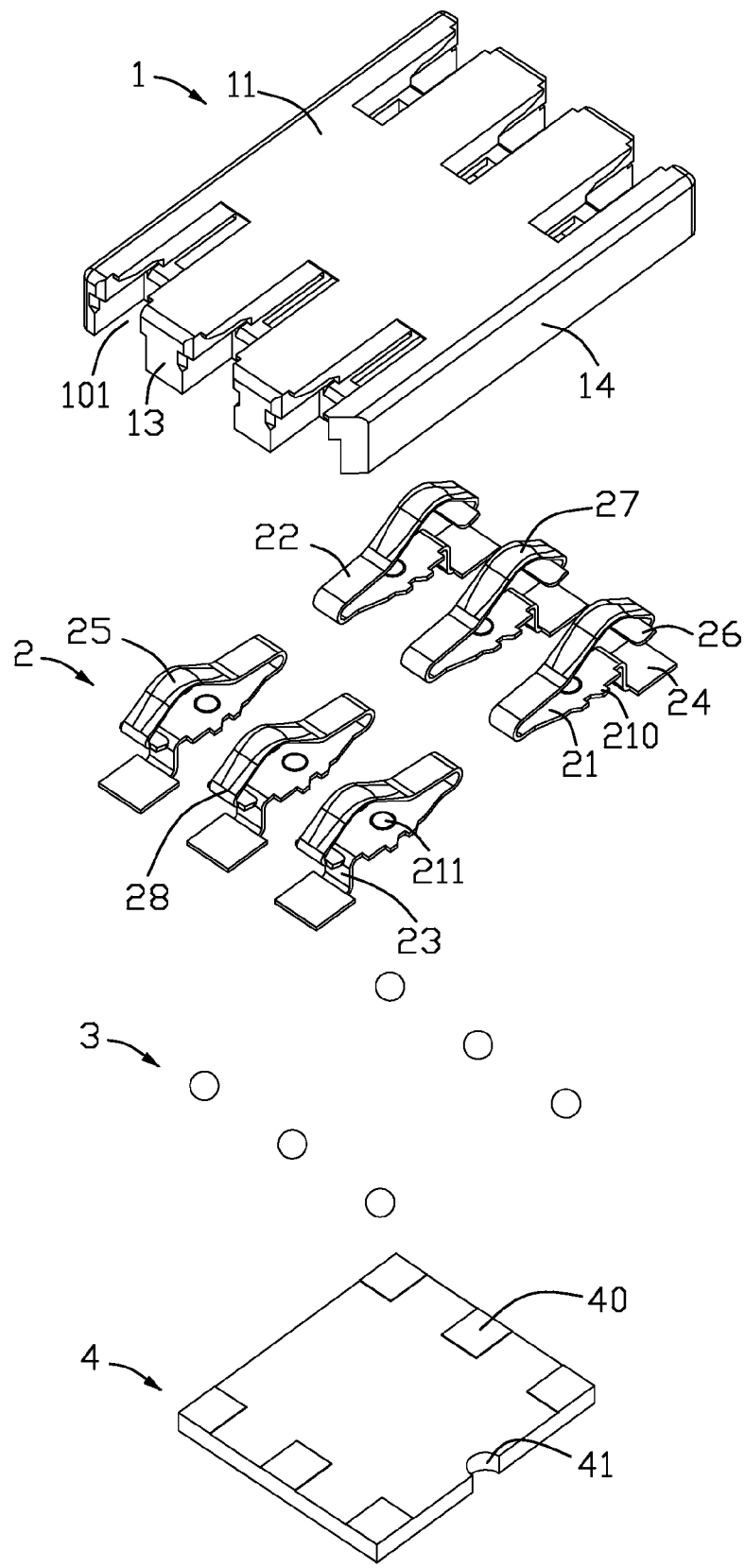
FIG. 2 is an exploded view of the electrical connector of FIG. 1.

In the following detailed description, for purposes of explanation, numerous specific details are set forth in order to provide a thorough understanding of the present invention.

Please refer to FIG. 1 to FIG. 5, the SIM Card connector according to the embodiment of present invention comprises an insulative housing 1, a plurality of contacts 2 retained in the insulative housing 1, an IC (Integrated Circuit) member 4 attached onto the insulating housing 1, and a plurality of solder balls 3 sandwiched between the IC member 4 and the contacts 2.

Please particular refer to FIG. 2 to FIG. 5, the insulating housing 1 configured as a rectangular, including a mating face 11 and a mounting face 12 (see FIGS. 2 & 5) opposite to the mating face 11, two opposite end faces 13 extending along a first direction, and two opposite side faces 14 extending along a second direction vertical to the first direction. A plurality of passageways 101 arranges as two sets along the second direction, each passageway 101 penetrating the mating face 11, the mounting face 12, and the corresponding end face 13.

Figure 3:
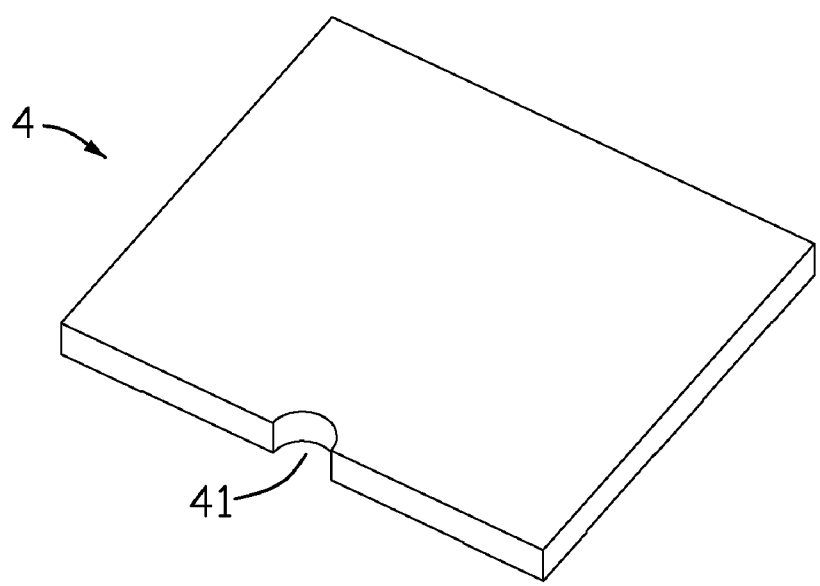
FIG. 3 is a partly perspective view of the SIM Card connector of FIG. 1, wherein the IC member is not assembled onto the insulating housing.
Figure 3:
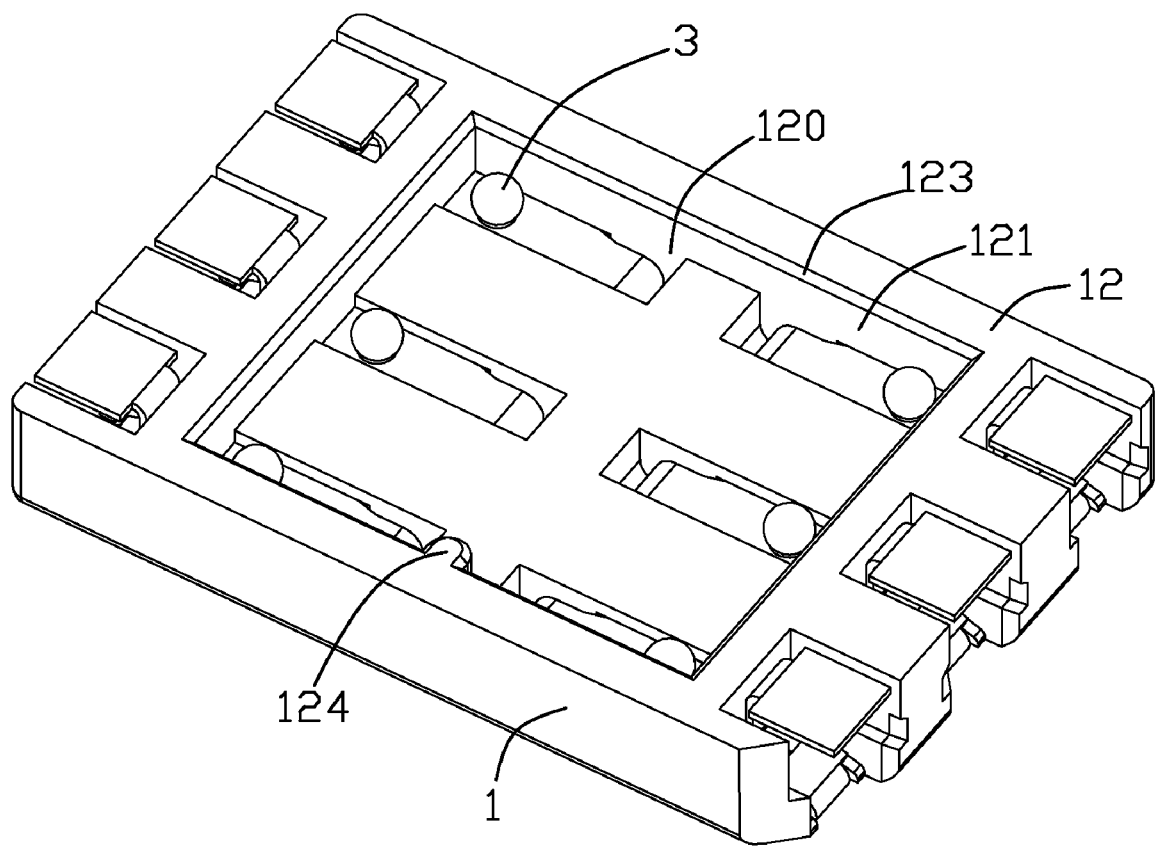
Figure 4:
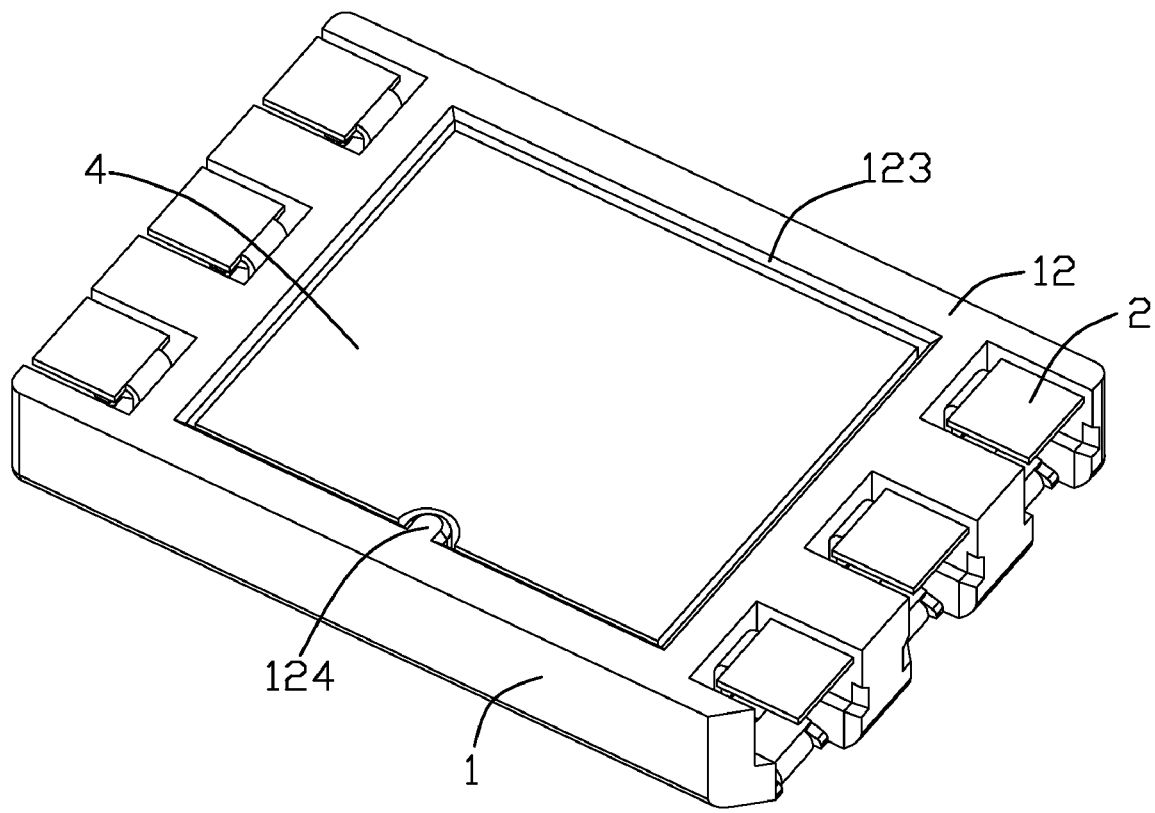
FIG. 4 is another perspective view of an electrical connector of FIG. 1.

Please particular refer to FIG. 3, the mounting face 12 defines a receptor 120 in the center thereof in order to accommodate the IC member 4. An upper edge of an inner surface of the receptor 120 defines slant surfaces 123 adapted to lead the IC member 4 into the receptor 120. Furthermore, one inner surface of the receptor 120 defines a post 124 protruding into a center of the receptor 120 to engage with a corresponding portion of the IC member 4.

Please still refer to FIG. 3, a plurality of recesses (no labeled) are defined on the mounting face 12, which communicated with the corresponding passageway 101 and adjacent to the receptor 120 but not communicated therewith.

The contacts 2 are retained into the corresponding passageways 101 of the insulative housing 1 and includes a plurality of signal contacts 27 and at least one grounding contact 28. Each of the signal contacts 27 and the grounding contact 28 includes a horizontal retention portion 21 extending along the second direction, a solder portion 24 horizontally extending from one end of the retention portion 21, a vertical portion 23 disposed between the retention portion 21 and the solder portion 24, a bend portion 22 extending cured from the other end of the retention portion 21 and forms a semi-circle along with the retention portion 21, a contact engaging portion 25 extending cured from a distal end of the bend portion 22 and disposed above the retention portion 21. A plurality of barbs 210 are defined on side edges of the retention portion 21. Moreover, the retention portion 21 defines an upper surface (no labeled) and a bottom surface (no labeled) opposite to the upper surface, wherein the bottom surface defines an accommodate portion 211 concaved from the bottom surface to the upper surface so as to receive and retain the solder ball 3. Finally, a press portion 26 is formed on a distal end of the contact engaging portion 25 and extends into a center between the contact engaging portion 25 and the retention portion 21 in order to engaging with an abut portion formed on the insulating housing 1.

The IC member 4 is a rectangular shape and compress and congregate at least an ESD protection member. Said IC member 4 includes two opposite first and second surfaces (no labeled). A plurality of electrical pads 40 are formed on the first surface thereon and corresponding with the recess portions 211 of the contacts 2. Further, a notch 41 is defined on one side edge of the IC member 4 in order to engage with the post 124 of the insulating housing 1.

A plurality of solder balls 3 are sandwiched between the IC member 4 and the housing 1 and disposed in the recess portion 211 of the contacts 2. When the solder balls 3 are planted onto the contacts 2, they are firmly connected with the contacts 2 and the IC member 4.

Figure 5:
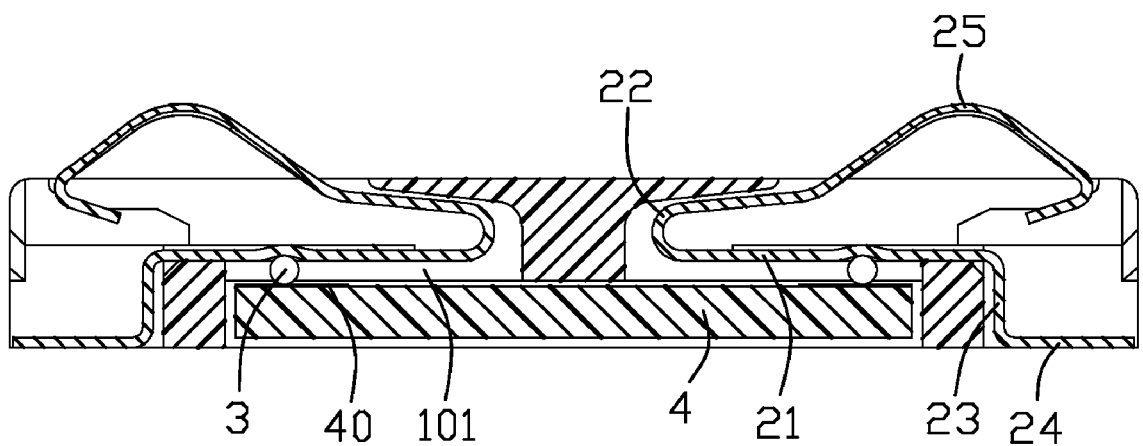
FIG. 5 is a cross-section view of the SIM Card connector of the FIG. 1.

Please also refer to FIGS. 1-4, when assembly, firstly, the contacts 2 are assembled into the corresponding passageways 101 of the insulating housing 1, particular refer to FIG. 3 and FIG. 5, wherein the retention portion 21 exposures on the mounting face 12 via the passageway 101, the tail portion 24 is received into the recess adjacent to the receptor 120 and coplanar with the mounting face 12 of the insulating housing 1, and the contact engaging portion 25 is protruding the mating face 11; secondly, the solder balls 3 are planted onto the corresponding recess portion 211 of the contact 2, for example, some solder paste is coating into the recess portion 211 and then the solder balls 3 is attached into the recess portion 211 via the solder paste, finally, heating is allied on the contacts and the solder paste is thawing and then the solder balls 3 is firmly retained onto the contact 2; finally, the IC member 4 is completely received into the receptor 120 of the housing, with the electrical pads 40 contacted with the solder balls 3 and the notch 41 engaged with the post 124 of the insulating housing 1.

In the above description of the preferred embodiment, a receptor 120 adapted for receiving the IC member 4 is defined by mounting face 12 of the insulating housing 1, and the IC member connected with the contact via planting a solder ball onto the contact, therefore, there has no need to provide a room to received the IC member with an ESD protection and the IC member can firmly contact with the contact.

It is to be understood, however, that even though numerous, characteristics and advantages of the present invention have been set fourth in the foregoing description, together with details of the structure and function of the invention, the disclosed is illustrative only, and changes may be made in detail, especially in matters of number, shape, size, and arrangement of parts within the principles of the invention to the full extent indicated by the broad general meaning of the terms in which the appended claims are expressed.

What is claimed is:

1. A SIM Card connector comprising:
a connector housing with a plurality of contact passageways in which a plurality of contacts retained; and
a IC member with ESD protection received in the connector housing and electrically connected with the contacts, wherein a retention device is disposed between an inner surface of the receptor of the housing and an outer surface of the IC member, wherein the retention device includes a notch and a post engaged with each other, wherein the notch is defined on a side surface of the IC member and the post is defined on an inner surface of the receptor.

2. The SIM Card connector as recited in claim 1, wherein one surface of the IC member defines a plurality of electrical pads adapted for connecting with the contacts.

3. The SIM Card connector as recited in claim 1, wherein each contact comprises a base portion, a tail portion extending from an end of the base portion, and an elastic portion extending from the other end of the base portion and above the base portion.

4. The SIM Card connector as recited in claim 3, wherein the base portion of the contact defines an upper surface and bottom surface, wherein the upper surface is facing to the elastic portion and a solder ball is sandwiched between the bottom surface of the base portion and the IC member.

5. The SIM Card connector as recited in claim 4, wherein the bottom surface of the base portion defines a concave in which the solder ball is seated.

6. The SIM Card connector as recited in claim 1, wherein the connector housing defines a receptor on a bottom surface in which the IC member is completely received.

7. The SIM Card connector as recited in claim 6, wherein a bottom surface of the IC member is coplanar with the bottom of the connector housing.

8. A SIM Card connector comprising:
an insulating housing having a mating face and a mounting face opposite to the mating face;
a plurality of contacts seated in the insulating housing, each including a retaining portion fixed into the insulating housing, a spring portion with a contact engaging portion projecting the mating face of the insulating housing, and a tail portion;
an IC member with an ESD protection received in a corresponding portion of the insulating housing; wherein
the IC member is electrically connected with the contacts by planting a solder ball therebetween, wherein the mounting face defines a recess portion in which the solder ball are received, wherein the mounting face of the insulating housing, the tail portion of the contact, and a bottom face of the IC member are coplanar with each other, wherein the insulating housing defines a plurality of room adapted for receiving the tail portion of the contact, wherein the room is adjacent to the receptor.

9. The SIM Card connector according to claim 8, wherein the IC member further defines a notch adapted for engaging with a dimple formed on an inner face of the receptor.

10. A SIM card connector for mounting to a printed circuit board, comprising:
an insulative housing defining a receiving cavity in an undersurface and a plurality of contact receiving passageways in two opposite sides and an upper side;
an IC member disposed in the receiving cavity;
a plurality of contacts disposed in the corresponding passageways, respectively, each of said contacts defining a deflectable contact section extending upwardly beyond the upper side, a solder tail around the undersurface, and a connection section between the contacting section and the tail; wherein
a portion of said connection section confronts the IC member and electrically contacts the IC member, wherein said IC member and said connection section is mechanically connected to each other via a solder piece, wherein the connection section is not downwardly deflectable while the contact section is downwardly deflectable.

* * * * *